(12) United States Patent
Haulick et al.

(10) Patent No.: US 8,175,290 B2
(45) Date of Patent: May 8, 2012

(54) FEEDBACK REDUCTION SYSTEM

(75) Inventors: Tim Haulick, Blaubeuren (DE); Gerhard Uwe Schmidt, Ulm (DE); Harald Lenhardt, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1180 days.

(21) Appl. No.: 11/775,687

(22) Filed: Jul. 10, 2007

(65) Prior Publication Data

US 2008/0025527 A1    Jan. 31, 2008

(30) Foreign Application Priority Data

Jan. 11, 2005   (EP) .................................. 05000404
Jan. 11, 2006   (WO) ............... PCT/EP2006/000197

(51) Int. Cl.
*H04B 15/00* (2006.01)
(52) U.S. Cl. ................... 381/93; 381/95; 381/96
(58) Field of Classification Search ............... 381/71.11, 381/71.1, 71.9, 11, 12, 93, 95, 96
See application file for complete search history.

(56) References Cited

U.S. PATENT DOCUMENTS

| | | | |
|---|---|---|---|
| 6,496,581 B1 | 12/2002 | Finn et al. | |
| 6,525,967 B1 | 2/2003 | Briner | |
| 6,665,410 B1 * | 12/2003 | Parkins | 381/71.1 |
| 6,665,411 B2 | 12/2003 | Steenhagen | |
| 2004/0252826 A1 | 12/2004 | Tian et al. | |
| 2005/0053244 A1 * | 3/2005 | Onishi et al. | 381/71.11 |

OTHER PUBLICATIONS

Author: Hansler et al. Tittle: Hands-free telephones—Joint control of echo cancellation and post-filtering. Dated: Nov. 18, 1999 Publisher: Elsevier Signal Sprocessing 80 (2000) 2295-2305.*
Author: Mader et al. Tittle: Step-size control for acoustic echo cancellation filters—an overview. Dated: Feb. 11, 2000 Publisher: Elsevier Signal Sprocessing 80 (2000) 1697-1719.*
Author: Schmidt et al Tiltle: Acoustic echo and noise control: a practical approach. Dated: May 2004 Publisher: Willey—IEEE Press Chapter 9 (pp. 163-219).*
Author: Jeannes et al. Tittle: Combined Noise and Echo Reduction in Hands-Free Systems: A Survey. Dated: Nov. 2001. Publisher: IEEE Transactions on speech and audio processing, vol. 9, No. 8.*
Le Bouquin Jeannes, Scalart, Faucon, Beaugeant: "Combined Noise and Echo Reduction in Hands-Free Systems: A Survey" IEEE Transactions on Speech and Audio Processing, vol. 9, No. 8, Nov. 2001.
Turbin V. et al.: Comparison of Three Post-Filtering Algorithms for Residual Acoustics, Speech, and Signal Processing, 1997. ICASSP-97, 1997 IEEE International Conference on Munich, Germany Apr. 21-24, 1997, pp. 307-310.

* cited by examiner

*Primary Examiner* — Vivian Chinq
*Assistant Examiner* — David Ton
(74) *Attorney, Agent, or Firm* — Sunstein Kann Murphy & Timbers LLP

(57) ABSTRACT

A feedback reduction system adaptively processes a microphone signal. An adaptive feedback suppression filter circuit processes the microphone signal, and an adaptive feedback compensation filter circuit further processes the microphone signal. The adaptive feedback suppression filter circuit processes the signal based upon output from the adaptive filter compensation filter circuit.

27 Claims, 3 Drawing Sheets

FEEDBACK REDUCTION SYSTEM

PRIORITY CLAIM

This application claims the benefit of priority from International Application No. PCT/EP2006/000197 filed Jan. 11, 2006, which claims the benefit of priority from European Patent Application No. 05 000404.3, filed Jan. 11, 2005. Application Nos. PCT/EP2006/00197 and 05 000404.3 are incorporated by reference.

BACKGROUND OF THE INVENTION

1. Technical Field

This disclosure relates to signal processing systems. In particular, this disclosure relates to a system that reduces acoustic feedback.

2. Related Art

In two-way speech communication between parties that simultaneously transmit and receive audio signals, some suppression of signals may occur. Without such signal suppression, feedback may occur, which may affect the quality and intelligibility of a voice conversation. Acoustic feedback may degrade the communication signal.

Hands-free voice communication systems in vehicles may suffer from feedback. Vehicle communication systems may allow for hands-free telephony with remote subscribers at a far end outside the vehicle, and may also allow for inter-cabin communication. Microphones and loudspeakers provided for front-seat and backseat passengers may provide improved acoustic conditions in the presence of background noise.

Methods to reduce acoustical feedback may utilize filters, similar to the echo compensation filters used in mobile telephones. Linear or nonlinear filters may synthesize a replica of the acoustic feedback, and a compensation signal may be obtained from the received signal of the loudspeakers. The compensation signal may be subtracted from the microphone output signal to generate a resulting signal.

However, it may be difficult to adapt the filter with high accuracy and an acceptable convergence rate. The impulse response may be identified for the frequencies showing the strongest feedback only, allowing in principle, adaptation of the filter coefficients for these frequencies. However, the filters may not be reliable at other frequencies. Consequently, perceptible artifacts caused by acoustic feedback may affect the intelligibility of acoustic signals. Therefore, there is a need for a system that reduces feedback.

SUMMARY

A feedback reduction system adaptively processes a microphone signal. An adaptive feedback suppression filter circuit processes the microphone signal, and an adaptive feedback compensation filter circuit further processes the microphone signal. The adaptive feedback suppression filter circuit processes the signal based upon an output from the adaptive filter compensation filter circuit.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION OF THE PREFERRED EMBODIMENTS

An audio signal may be detected by one or more microphones and digitized to generate a microphone output signal. Preprocessing the microphone signal may include a Fast Fourier Transform process, and may result in a complex microphone signal.

Figure 1:
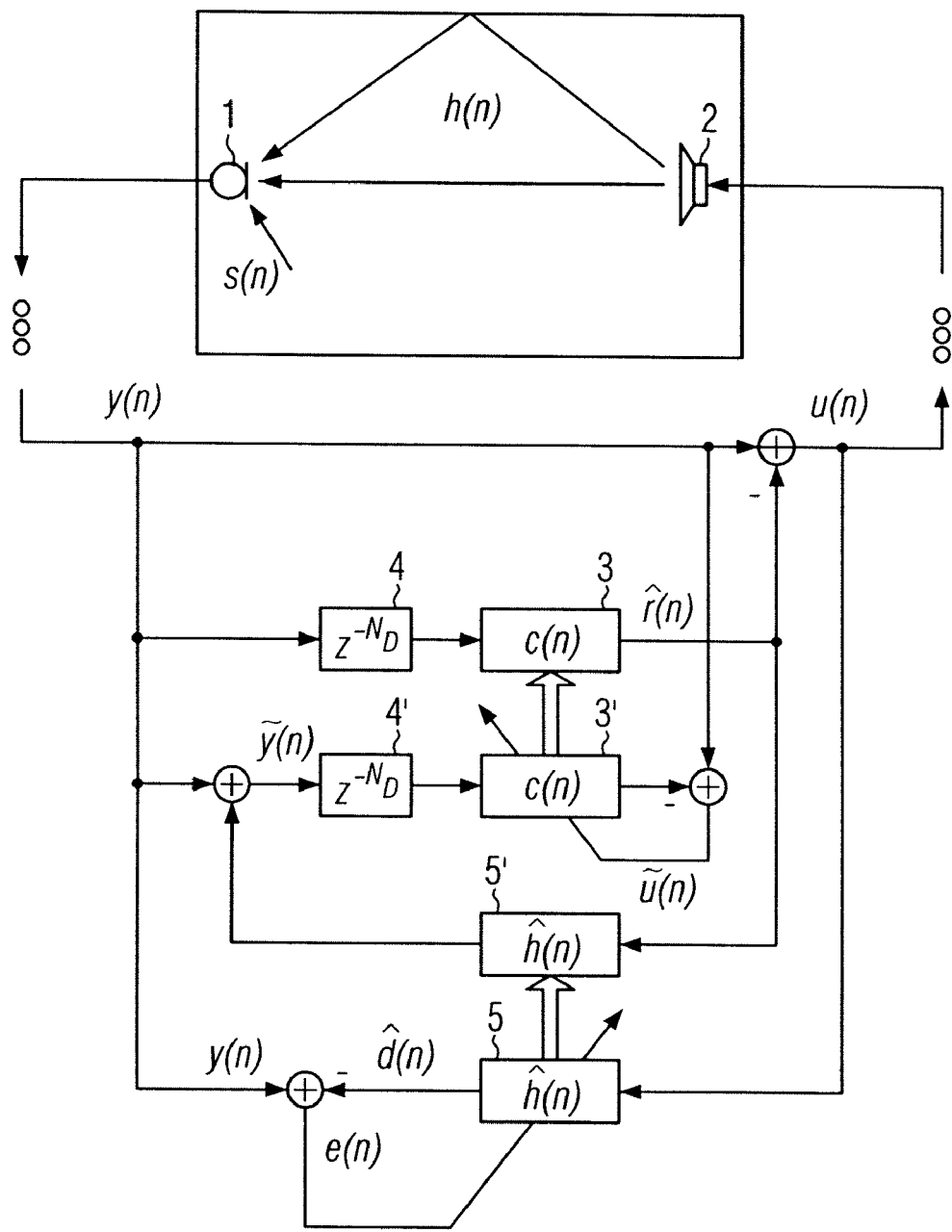
FIG. 1 is a feedback reduction system having feedback suppression in a signal path, and feedback compensation in a shadow path.

FIG. 1 is a feedback reduction system Signals may be delayed before being input to a feedback suppression filter circuit. The signal may be delayed by about 2 milliseconds to avoid suppressing short-time correlations, also referred to as the short-time spectral envelope. Suppression of the short-time spectral envelope may result in an artificial-sounding processed speech signal.

A feedback suppression filter circuit 3 and a feedback compensation filter circuit 5 may be adaptive. The respective filter coefficients may be adapted during signal processing. A suppression filter circuit may generate feedback components of the microphone signal that may be subtracted from the microphone signal. The feedback compensation filter circuit 5 may provide an estimate for the impulse response that may be subtracted from the microphone signal. The filter coefficients of the feedback compensation filter circuit 5 may be adapted for the dominant feedback frequency or dominant feedback frequencies. The output of the feedback compensation filter circuit 5 may influence processing by the feedback suppression filter circuit 3.

Processing by the feedback suppression filter circuit 3 and the feedback compensation filter circuit 5 may result in a stable feedback reduction without significant oscillation of the suppression characteristics. Feedback effects may be reduced below perceptible levels.

The feedback compensation filter circuit 5 may estimate an impulse response, and the filter coefficients may be adapted. If the feedback compensation filter circuit 5 generates a first input signal for the feedback suppression filter circuit 3, the dependence of the feedback suppression filter circuit on the compensation filter may be efficient. Consequently, the output signal may be improved.

Processing by the adaptive feedback suppression filter circuit 3 may be performed in a signal path and in a non-signal path. The adaptation of the filter coefficients of the adaptive feedback suppression filter 3 circuit may be performed in the non-signal path, and the adapted filter coefficients may be used in the signal path.

Separation of the signal path from the non-signal path (referred to as the "shadow path") for background signal processing may avoid artifacts due to the feedback compensation being mixed with the output signal. Such artifacts may be generated during the adaptation of the feedback compensation filter circuit 5, and may only influence the signal input in the shadow path and not the output audio signal.

After adaptation of the feedback suppression filter circuit 3 based on filter coefficients generated by the feedback compensation filter circuit 5, the filter coefficients may be used without modification in the signal path to generate one or more accurate feedback components. The feedback components may be subtracted from the microphone signal. Use of the unmodified filter coefficients may indicate a direct dependence of the suppression filtering process on the compensation filtering process. In some systems, modification of the filter coefficients obtained in the shadow path may be performed before using such coefficients in the signal path.

The portion of the microphone signal subtracted may be modified and added to the first input signal of the shadow path. The microphone signal may be corrected for feedback components by the feedback suppression filter circuit 3. Initially, the feedback components may be obtained by predetermined filter coefficients. The filter coefficients of the feedback suppression filter circuit 3 may be obtained based on the first input signal. The first input signal serves as a working signal generated by the feedback compensation filter circuit 5, and provides an impulse response.

Artifacts generated by the feedback compensation filter circuit 5 may only influence the working signal rather than affecting the output signal directly. The algebraic manipulations may be performed efficiently by robust processes. An adaptive or non-adaptive decorrelation filter circuit may enhance the convergence characteristics of the adaptation processes. An inverse decorrelation filter circuit may not be necessary if the signal decorrelation occurs in the shadow path only.

The adaptive feedback suppression filter circuit 3 may include a finite impulse response filter or an infinite impulse response filter. Finite impulse response (FIR) filters are generally stable because no feedback branch is provided. Recursive infinite impulse response (IIR) filters typically meet a given set of specifications with a lower filter order than a corresponding FIR filter. Feedback suppression for a very narrow band typically can be achieved more efficiently by IIR filters. IIR filters may require continuous stability checking. Adaptation of the filter coefficients of the adaptive feedback suppression filter circuit 3 and/or the adaptive feedback compensation filter circuit 5 may be performed based on a normalized least mean square process satisfying convergence characteristics.

If more than one microphones are used to detect audio signals, the microphone signal may be processed by an adaptive or non-adaptive beamforming circuit. Each of the microphones may provide a microphone signal input to the beamforming circuit. The beamforming circuit may output a beamformed signal, also referred to as the "microphone signal."

The beamforming circuit may include a blocking matrix and an adaptive noise canceling circuit that may subtract noise signals generated by an adaptive noise canceling circuit. The blocking matrix and an adaptive noise canceling circuit may enhance the intelligibility of the output audio.

The feedback reduction system may be used in a vehicle communication system. Feedback reduction may be desirable in vehicle cabins. The vehicle cabin may include directional microphones and loudspeakers located at each seat of the vehicle. The feedback reduction system may also improve the intelligibility of speech signals generated by the hearing aids.

FIG. 1 shows a feedback reduction system. A microphone 1 may detect a speech signal or local signal $s(n)$, representing a verbal utterance of one communication party. The microphone 1 may also detect signals from a loudspeaker 2. The impulse response $h(n)$ of the loudspeaker 2 and the microphone 1 may include the signals generated directly by the loudspeaker 2, and loudspeaker signals reflected by the walls of the closed environment. The total impulse response $h(n)$ may include reflections and/or reverberation.

The signals generated by the microphone may be preprocessed. The preprocessing may include Fast Fourier Transform processing, which may generate a complex microphone signal $y(n)$, where n is the frequency bin. If a microphone array or an array of directional microphones are used, preprocessing may include a time delay corresponding to the different microphone signals. For each microphone signal, the time delay may be adjusted based on the geometry of microphones, to synchronize the microphone signals with a corresponding desired target signal.

An adaptive weighted sum beamforming circuit may combine the preprocessed or time delayed signals of the multiple microphones to obtain a single beamformed signal. The single beamformed signal may be referred to as the "microphone signal" $y(n)$, which may have an improved signal-to-noise ratio. The beamforming circuit may include an adaptive blocking matrix and an adaptive noise canceling filter.

The microphone signal $y(n)$ may be corrected for feedback contributions included in the impulse response $h(n)$. The adaptive feedback suppression filter circuit 3 having a coefficient vector $c(n)$ may reduce acoustic feedback. In some systems, the adaptive feedback suppression filter circuit 3 may be a finite impulse response (FIR). If acoustic feedback occurs at particular frequencies, the FIR filter may suppress those specific frequencies.

Prior to filtering, the microphone signal $y(n)$ may be delayed by a delay circuit 4. The amount of delay may be equal to about N clock cycles, where N may be less than the inverse of the respective feedback frequency. In some systems, the value of N may be chosen to cause a delay of about 2 milliseconds to avoid suppressing short-time correlations, that is, to preserve the short-time spectral envelope. Suppression of the short-time spectral envelope may result in a artificial-sounding processed speech signal. The filter may have between about 80 to about 100 filter coefficients or taps using a sampling rate of about 16 kHz. The filter coefficients may be calculated using an NLMS process.

The FIR filter may be adapted using the microphone signal $y(n)$ and an output signal $u(n)$. Feedback may be minimized in the output signal $u(n)$. An artificially generated or working signal $\tilde{y}(n)$ may used instead of $y(n)$. The working signal $\tilde{y}(n)$ may be generated by the feedback compensation filter circuit 5 having a vector of filter coefficients $\hat{h}(n)$. The FIR filter of the feedback compensation filter circuit 5 may include several filter components working independently at different frequency ranges.

The feedback compensation filter circuit 5 may model the impulse response $h(n)$ of the loudspeaker 2 and the microphone 1 using an estimated impulse response. Convoluting the output signal $u(n)$ with the estimated impulse response may yield an estimated feedback signal $\hat{d}(n)$. An error signal $e(n)$ may be obtained by subtracting the estimated feedback signal $\hat{d}(n)$ from the microphone signal $y(n)$. The error signal $e(n)$ may be used for adaptation of the compensation filter circuit 5. The error signal $e(n)$ may not be used directly to generate the actual audio output signal $u(n)$.

The calculated filter coefficients of the feedback compensation filter circuit 5 may be used to generate the working signal $\tilde{y}(n)$ as follows. To obtain the respective working signal $\tilde{y}(n)$ for the microphone signal $y(n)$ using the estimated impulse response $\hat{h}(n)$, the microphone signal $y(n)$ may be delayed by the delay circuit 4, and feedback components $\hat{r}(n)$ may be subtracted from $y(n)$ by the feedback suppression filter circuit 3. The working signal $\tilde{y}(n)$ may be generated by convoluting the feedback components r̂(n) with the estimated impulse response and adding the convolution results to the microphone signal y(n). The working signal γ̃(n) may provide an input signal for feedback suppression filter circuit 3', which in some systems, may not include a feedback path.

Adding the convolution of the feedback components r̂(n) with the estimated impulse response ĥ(n) may be performed in the background or the shadow path, rather than in the actual signal path. The working signal γ̃(n) may not used as the audio signal output from the signal processing components but rather, may be used to adapt the feedback suppression filter circuit 3', which may operate in the shadow path. A copy of the working signal γ̃(n) may be used in the signal path to generate the desired loudspeaker output signal u(n). Adaptation may optimize the shadow path output signal ũ(n) that may result by subtracting the feedback components r̂(n) from the microphone signal in the shadow path.

Adaptation of the feedback suppression filter circuit 3' and the feedback suppression filter circuit 3 may be performed using an NLMS process having a small step size. The size of the steps may range from about $10^{-5}$ to about $10^{-2}$.

In some systems, the convergence rate for the feedback suppression filter circuit 3' may be increased by processing the working signal γ̃(n) with a decorrelation filter before inputting the working signal γ̃(n) to the suppression filter 3'. The decorrelation filter may be an adaptive filter. Because adaptation may be performed in the shadow path rather than in the signal path, an inverse decorrelation filter may not be needed.

Figure 2:
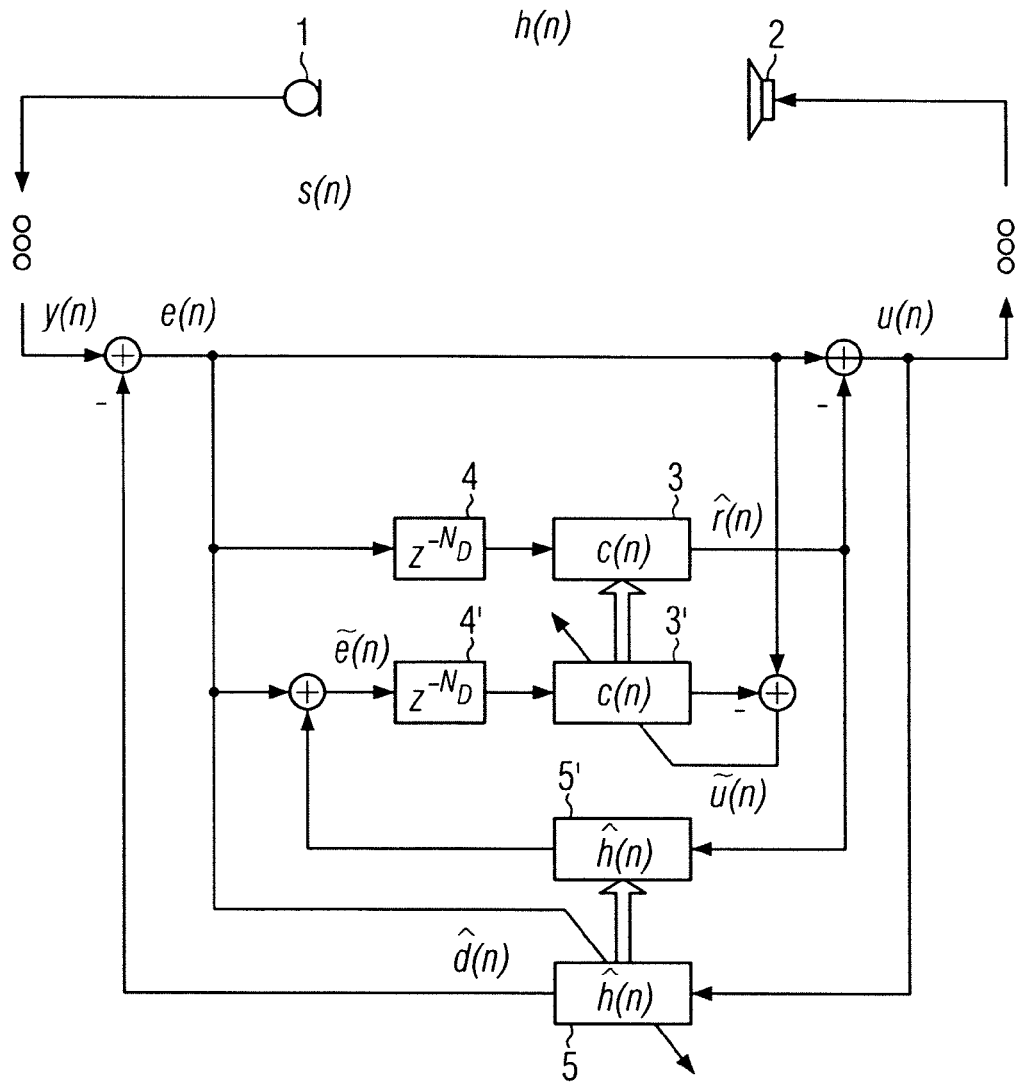
FIG. 2 is a feedback reduction system having feedback suppression and feedback compensation in a signal path.

FIG. 2 shows a feedback reduction system where the feedback compensation may be performed in the signal path rather than in the shadow path. The microphone or a microphone array 1 may detect audio signals output by one or more loudspeakers 2. A digitized microphone signal y(n) may be processed to reduce acoustic feedback.

The adaptive compensation filter circuit 5 may include a vector of filter coefficients ĥ(n). The adaptive compensation filter circuit 5 may estimate an impulse response to obtain an estimate for the feedback signal d̂(n). The feedback signal d̂(n) may be subtracted from the microphone signal y(n) to generate the reduced error signal e(n). A copy of the coefficient vector ĥ(n) 5' may be used to generate the signal ẽ(n). The signal ẽ(n) may be input to the feedback suppression filter circuit 3' after a time delay 4'.

Convoluting the feedback components r̂(n) with the estimated impulse response and adding the convolution result to the error signal e(n) may yield the signal ẽ(n). The signal ẽ(n) may be input to the feedback suppression filter circuit 3'. The feedback suppression filter circuit 3' may be an FIR or an IIR filter. Adaptation of the coefficient vector ĥ(n) of the feedback suppression filter circuit 3' may be performed by optimizing the signal ẽ(n) for the resulting signal ũ(n). The adaptive feedback suppression filter circuit 3 may use a copy of ĥ(n) to correct the error signal e(n) for the feedback components r̂(n). The signal u(n) may be output by the loudspeaker with reduced feedback.

If more than one microphone is used, a beamforming circuit may generate a beamformed signal. Adaptive or non-adaptive noise reduction filters may process the beamformed signal. The processed microphone signal may be phase shifted when the feedback reduction system of FIG. 2 is used with a hearing aid. The phase shift may be the difference in phase between y(n) and u(n). The feedback suppression filter circuits 3 and 3' may provide the phase shift.

Figure 3:
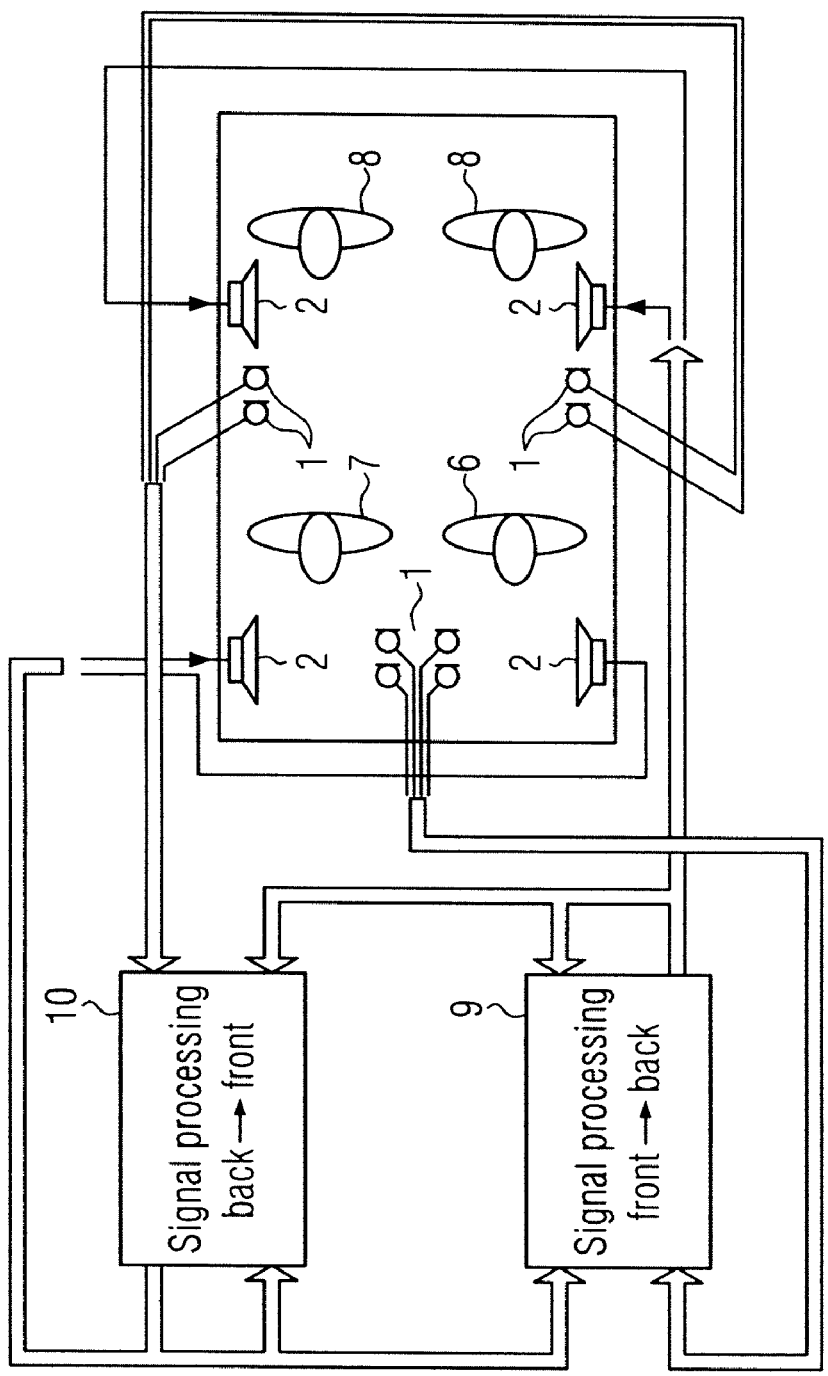
FIG. 3 is a feedback reduction system and a vehicle communication system.

FIG. 3 shows a feedback reduction system in a vehicle communication system. Microphones 1 and loudspeakers 2 may be provided for a driver 6, the front-seat passenger 7, and the backseat passengers 8, respectively. The vehicle communication system may facilitate communication between front-seat and backseat passengers.

The microphones 1 positioned closest to the driver may detect speech by the driver 6 and may generate a microphone signal. A signal processing circuit 9 may process the microphone signal. The signal processing circuit 9 may include the feedback reduction system. The signal processing circuit 9 may output the driver's speech to the backseat passengers 8. Similarly, a signal processing circuit 10 may process and output speech from the backseat passengers 8 to the driver 6.

The signal processing systems 9 and 10 may reduce feedback. The vehicle communication system may include adaptive feedback suppression filters and feedback compensation filters described above with respect to FIGS. 1 and 2. The processing of speech signals from the driver and processing of speech signals from the passengers may not be independent.

The logic, circuitry, and processing described above may be encoded in a computer-readable medium such as a CD-ROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM," an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. Method for processing a microphone signal to obtain an output signal with reduced acoustic feedback, the method comprising:
    processing the microphone signal by an adaptive feedback suppression filter circuit performed in a signal path and in a non-signal path;
    processing the microphone signal by an adaptive feedback compensation filter circuit; and
    where:
    the processing by the adaptive feedback suppression filter circuit is dependent on the processing by the adaptive feedback compensation filter circuit;
    the adaptation of the filter coefficients of the adaptive feedback suppression filter circuit is performed in the non-signal path,
    the adaptive feedback suppression filter circuit producing in the signal path an adaptive feedback suppression output,
    the output signal with reduced acoustic feedback is produced as the result of combining the microphone signal and the adaptive feedback suppression output and wherein the output signal is used as an input signal to the adaptive feedback compensation circuit and the adaptive feedback suppression output is used as an input to the adaptive feedback compensation circuit.

2. The method according to claim 1, where
    a first input signal for the adaptive feedback suppression filter circuit is generated based on filter coefficients of the adaptive feedback compensation filter circuit, and
    the filter coefficients of the adaptive feedback suppression filter circuit are adapted based on the first input signal.

3. The method according to claim 1, where the adapted filter coefficients are used without modification in the signal path.

4. The method according to claim 1, where
    the first input signal is input in the non-signal path;
    the first input signal is generated from the microphone signal and the convolution result of an estimated impulse response obtained by the adaptive feedback compensation filter circuit and feedback components of the microphone signal previously obtained by processing the microphone signal by the adaptive feedback suppression filter circuit, and
    the microphone signal is input in the signal path.

5. The method according to claim 4, further comprising processing the first input signal by an adaptive or non-adaptive decorrelation filter circuit.

6. The method according to claim 2, where
    the first input signal is input in the non-signal path;
    the first input signal is generated from a reduced microphone signal generated by a subtraction of an estimated feedback signal obtained by the adaptive feedback compensation filter circuit from the microphone signal and the convolution result of an estimated impulse response obtained by the adaptive feedback compensation filter circuit and feedback components of the microphone signal previously obtained by processing the reduced microphone signal by the adaptive feedback suppression filter circuit, and the microphone signal reduced by the estimated impulse response that is obtained by the feedback compensation means is input in the signal path.

7. The method according to claim 6, further comprising processing the first input signal by an adaptive or non-adaptive decorrelation filter circuit and processing the output signal by an inverse decorrelation filter circuit.

8. The method according to claim 6, where the adaptive feedback suppression filter circuit comprises a finite impulse response filter or an infinite impulse response filter.

9. The method according to claim 6, where adaptation of the filter coefficients of the adaptive feedback suppression filter circuit and/or the adaptive feedback compensation filter circuit is performed on the basis of a normalized least mean square algorithm.

10. The method according to claim 6, where the microphone signal and/or the output signal is processed by an adaptive and/or non-adaptive noise reduction filter circuit.

11. The method according to claim 6, where the microphone signal is obtained by an adaptive or non-adaptive beamforming circuit that processes signals detected by at least two microphones.

12. A non-transitory computer-readable storage medium having processor executable instructions to reduce feedback by performing the acts of:
    processing a microphone signal by an adaptive feedback suppression filter circuit performed in a signal path and in a non-signal path;
    processing the microphone signal by an adaptive feedback compensation filter circuit; and
    where:
    the processing by the adaptive feedback suppression filter circuit is dependent on the processing by the adaptive feedback compensation filter circuit,
    the adaptation of the filter coefficients of the adaptive feedback suppression filter circuit is performed in the non-signal path,
    the adapted filter coefficients are used in the signal path,
    the adaptive feedback suppression filter circuit in the signal path producing an adaptive feedback suppression output, and
    the output signal with reduced acoustic feedback is produced as the result of combining the microphone signal and the adaptive feedback suppression output and wherein the output signal is used as an input signal to the adaptive feedback compensation circuit and the adaptive feedback suppression output is used as an input to the adaptive feedback compensation circuit.

13. The non-transitory computer readable medium according to claim 12, where the adapted filter coefficients are used without modification in the signal path.

14. The non-transitory computer readable medium according to claim 12, where the first input signal is input in the non-signal path;
    the first input signal is generated from the microphone signal and the convolution result of an estimated impulse response obtained by the adaptive feedback compensation filter circuit and feedback components of the microphone signal previously obtained by processing the microphone signal by the adaptive feedback suppression filter circuit, and the microphone signal is input in the signal path.

15. The non-transitory computer readable medium according to claim 14, further comprising: processing the first input signal by an adaptive or non-adaptive decorrelation filter circuit.

16. The non-transitory computer readable medium according to claim 12, where the first input signal is input in the non-signal path; the first input signal is generated from a reduced microphone signal generated by a subtraction of an estimated feedback signal obtained by the adaptive feedback compensation filter circuit from the microphone signal and the convolution result of an estimated impulse response obtained by the adaptive feedback compensation filter circuit and feedback components of the microphone signal previously obtained by processing the reduced microphone signal by the adaptive feedback suppression filter circuit, and the microphone signal reduced by the estimated impulse response that is obtained by the feedback compensation means is input in the signal path.

17. The non-transitory computer readable medium according to claim 16, further comprising processing the first input signal by an adaptive or non-adaptive decorrelation filter circuit and processing the output signal by an inverse decorrelation filter circuit.

18. The non-transitory computer readable medium according to claim 16, where the adaptive feedback suppression filter circuit comprises a finite impulse response filter or an infinite impulse response filter.

19. The non-transitory computer readable medium according to claim 16, where adaptation of the filter coefficients of the adaptive feedback suppression filter circuit and/or the adaptive feedback compensation filter circuit is performed on the basis of a normalized least mean square algorithm.

20. The non-transitory computer readable medium according to claim 16, where the microphone signal and/or the output signal is processed by an adaptive and/or non-adaptive noise reduction filter circuit.

21. The non-transitory computer readable medium according to claim 16, where the microphone signal is obtained by an adaptive or non-adaptive beamforming circuit that processes signals detected by at least two microphones.

22. System for audio signal processing with feedback reduction for producing an output signal with reduced feedback, comprising:
 a signal path and a non-signal path;
 an adaptive feedback compensation filter circuit; and
 an adaptive feedback suppression filter circuit configured to be adapted on the basis of the adapted filter coefficients of the adaptive feedback compensation filter circuit and configured to adapt its filter coefficients in the non-signal path and subsequently use the filter coefficients adapted in the non-signal path in the signal path, the adaptive feedback suppression filter circuit in the signal path producing an adaptive feedback suppression output, and
 the output signal with reduced acoustic feedback is produced as the result of combining the microphone signal and the adaptive feedback suppression output wherein the output signal used as an input to the adaptive feedback compensation circuit and the adaptive feedback suppression output used as an input to the adaptive feedback compensation circuit.

23. The system according to claim 22 where:
 a first input signal for the adaptive feedback suppression filter circuit is generated using the adapted filter coefficients of the adaptive feedback compensation filter circuit, and where the adaptive feedback suppression filter circuit is configured to be adapted on the basis of the first input signal.

24. The system according to claim 23, where the adaptive feedback suppression filter circuit is configured to use the filter coefficients adapted in the non-signal path without modifications in the signal path.

25. The system according to claim 24, configured to generate the first input signal from the microphone signal and the convolution result of an estimated impulse response obtained by the adaptive feedback compensation filter circuit and feedback components of the microphone signal previously obtained by processing the microphone signal by the adaptive feedback suppression filter circuit; input the first signal in the non-signal path, and input the microphone signal in the signal path.

26. The system according to one of the claim 25, further comprising an adaptive or non-adaptive decorrelation filter circuit configured to process the first input signal.

27. The system according to claim 24, configured to generate the first input signal from a reduced microphone signal generated by a subtraction of an estimated feedback signal obtained by the adaptive feedback compensation filter circuit from the microphone signal and the convolution result of an estimated impulse response obtained by the adaptive feedback compensation filter circuit and feedback components of the microphone signal previously obtained by processing the reduced microphone signal by the adaptive feedback suppression filter circuit; input the first signal in the non-signal path, and input the microphone signal reduced by an estimated impulse response that is obtained by the feedback compensation means in the signal path.

\* \* \* \* \*